US012406143B2

(12) United States Patent
Ahmed et al.

(10) Patent No.: US 12,406,143 B2
(45) Date of Patent: Sep. 2, 2025

(54) SYSTEMS AND METHODS FOR IDENTIFYING AND REMOVING BIAS FROM COMMUNICATIONS

(71) Applicant: JPMORGAN CHASE BANK, N.A., New York, NY (US)

(72) Inventors: Fatima Ahmed, Pflugerville, TX (US); Noor Portillo, Mansfield, TX (US); Aditya Patel, Frisco, TX (US); Sharat Nayak, Dallas, TX (US); Nick Stanton, Bristol, PA (US); David M Lin, Addison, TX (US); Madhulata Guttikonda, Allen, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 331 days.

(21) Appl. No.: 18/045,939

(22) Filed: Oct. 12, 2022

(65) Prior Publication Data
US 2024/0126995 A1    Apr. 18, 2024

(51) Int. Cl.
    G06F 40/30      (2020.01)
    G06F 40/279     (2020.01)

(52) U.S. Cl.
    CPC .......... *G06F 40/30* (2020.01); *G06F 40/279* (2020.01)

(58) Field of Classification Search
    None
    See application file for complete search history.

(56) References Cited

U.S. PATENT DOCUMENTS

| | | | |
|---|---|---|---|
| 2013/0151240 A1* | 6/2013 | Myslinski | G06Q 50/01 704/9 |
| 2018/0246873 A1* | 8/2018 | Latapie | G06N 3/08 |
| 2020/0073902 A1* | 3/2020 | Milazzo | G06F 16/9536 |
| 2020/0349182 A1* | 11/2020 | Cintas | G06N 5/04 |
| 2020/0394265 A1* | 12/2020 | Ray | G06F 40/205 |
| 2022/0180068 A1* | 6/2022 | Sahayaraj | G06F 40/166 |
| 2022/0222438 A1* | 7/2022 | Kwatra | G06F 40/289 |
| 2022/0335217 A1* | 10/2022 | Panwar | G06F 40/30 |
| 2022/0351842 A1* | 11/2022 | Zheng | G16H 50/20 |
| 2022/0366153 A1* | 11/2022 | Li | G06F 16/24578 |
| 2022/0374604 A1* | 11/2022 | Sivakumar | G06F 40/35 |
| 2023/0036791 A1* | 2/2023 | Carr | G16H 20/70 |
| 2023/0067628 A1* | 3/2023 | Carter | G06F 16/489 |
| 2023/0214603 A1* | 7/2023 | Carter | G06F 40/40 704/9 |

(Continued)

*Primary Examiner* — Douglas Godbold
(74) *Attorney, Agent, or Firm* — GREENBERG TRAURIG LLP

(57) ABSTRACT

Systems and methods for identifying and removing bias from communications are disclosed. In one embodiment, a method for identifying bias may include: (1) receiving, by a bias identification computer program executed by an electronic device and from a user electronic device, text comprising a plurality of passages; (2) converting, by the bias identification computer program, each of the plurality of passages into a vector; (3) determining, by the bias identification computer program, that a custom entity in a bias category is present in one of the plurality of vectors or in a preceding or subsequent vector using a trained bias identification machine learning engine; and (4) returning, by the bias identification computer program and to the user electronic device, an indication that the one of the plurality of vectors is biased.

17 Claims, 5 Drawing Sheets

(56) References Cited

U.S. PATENT DOCUMENTS

| | | | | |
|---|---|---|---|---|
| 2023/0274179 A1* | 8/2023 | Tsang | ............... | G06N 20/00 |
| | | | | 706/12 |
| 2023/0316003 A1* | 10/2023 | Friedman | ............ | G06N 3/0442 |
| | | | | 704/9 |
| 2023/0409969 A1* | 12/2023 | Panda | ............... | G06N 20/00 |

* cited by examiner

SYSTEMS AND METHODS FOR IDENTIFYING AND REMOVING BIAS FROM COMMUNICATIONS

BACKGROUND OF THE INVENTION

1. Field of the Invention

Embodiments generally relate to systems and methods for identifying and removing bias from communications.

2. Description of the Related Art

"Unconscious bias" is generally considered to be social stereotypes about individuals or groups of people that are formed by a person unconsciously. Researchers suggest that unconscious bias occurs automatically as our brain makes quick judgments based on our past experiences and background. Unconscious biases are usually exhibited towards factors like class, gender, race, ethnicity, and sexual orientation. Because these biases are not conscious, they are present even in people who are genuinely committed to diversity, equity, and inclusion efforts. Thus, these biases are more pervasive and difficult to control than deliberate discrimination.

SUMMARY OF THE INVENTION

Systems and methods for identifying and removing bias from communications are disclosed. In one embodiment, a method for identifying bias may include: (1) receiving, by a bias identification computer program executed by an electronic device and from a user electronic device, text including a plurality of passages; (2) converting, by the bias identification computer program, each of the plurality of passages into a vector; (3) determining, by the bias identification computer program, that a custom entity in a bias category is present in one of the plurality of vectors or in a preceding or subsequent vector using a trained bias identification machine learning engine; and (4) returning, by the bias identification computer program and to the user electronic device, an indication that the one of the plurality of vectors is biased.

In one embodiment, the text may be from a document, an email, or a transcription of audio.

In one embodiment, the method may also include: identifying, by the bias identification computer program, custom entities in the text; and classifying, by the bias identification computer program, the custom entities into a plurality of categories, wherein one of the categories may include the bias category.

In one embodiment, the custom entities may include parts of speech, intensity modifiers, and/or sentiment.

In one embodiment, the method may also include: identifying, by the bias identification computer program, a replacement word for the custom entity that is in the bias category; and suggesting, by the bias identification computer program, the replacement word in the indication that the one of the plurality of vectors is biased.

In one embodiment, the replacement word may be identified using a trained machine learning scoring engine.

In one embodiment, the method may also include generating, by the bias identification computer program, a bias score for the text.

In one embodiment, the method may also include: receiving, by the bias identification computer program, feedback on the indication from the user electronic device; and retraining, by the bias identification computer program, the trained bias identification machine learning engine based on the feedback.

According to another embodiment, a system may include: a user electronic device providing text may include a plurality of passages, wherein the text is from a document, an email, or a transcription of audio; a bias identification computer program executed by an electronic device; and a custom entity database comprising a plurality of custom entities, each custom entity classified into a category, The bias identification computer program receives text comprising a plurality of passages from the user electronic device, converts each of the plurality of passages into a vector, uses a trained bias identification machine learning engine to identify a text custom entity in one of the plurality of vectors or in a preceding or subsequent vector and to determine that the custom entity is in a bias category of the plurality of categories, and returns an indication that the one of the plurality of vectors is biased to the user electronic device.

In one embodiment, the custom entities comprise parts of speech, intensity modifiers, and/or sentiment.

In one embodiment, the bias identification computer program identifies a replacement word for the custom entity that is in the bias category and suggests the replacement word in the indication that the one of the plurality of vectors is biased.

In one embodiment, the replacement word may be identified using a trained machine learning scoring engine.

In one embodiment, the bias identification computer program generates a bias score for the text.

In one embodiment, the bias identification computer program receives feedback on the indication from the user electronic device and retrains the trained bias identification machine learning engine based on the feedback.

According to another embodiment, a non-transitory computer readable storage medium, may include instructions stored thereon, which when read and executed by one or more computer processors, cause the one or more computer processors to perform steps comprising: receiving, from a user electronic device, text comprising a plurality of passages, wherein the text is from a document, an email, or a transcription of audio; converting each of the plurality of passages into a vector; determining that a custom entity in a bias category is present in one of the plurality of vectors or in a preceding or subsequent vector using a trained bias identification machine learning engine; and returning, to the user electronic device, an indication that the one of the plurality of vectors is biased.

In one embodiment, the non-transitory computer readable storage medium may also include instructions stored thereon, which when read and executed by one or more computer processors, cause the one or more computer processors to perform steps comprising: identifying custom entities in the text, wherein the custom entities comprise parts of speech, intensity modifiers, and/or sentiment; and classifying the custom entities into a plurality of categories, wherein one of the categories comprises the bias category.

In one embodiment, the non-transitory computer readable storage medium may also include instructions stored thereon, which when read and executed by one or more computer processors, cause the one or more computer processors to identify a replacement word for the custom entity that is in the bias category and suggest the replacement word in the indication that the one of the plurality of vectors is biased.

In one embodiment, the replacement word may be identified using a trained machine learning scoring engine.

In one embodiment, the non-transitory computer readable storage medium may also include instructions stored thereon, which when read and executed by one or more computer processors, cause the one or more computer processors to generate a bias score for the text.

In one embodiment, the non-transitory computer readable storage medium may also include instructions stored thereon, which when read and executed by one or more computer processors, cause the one or more computer processors to receive feedback on the indication from the user electronic device and to retrain the trained bias identification machine learning engine based on the feedback.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for identifying and removing bias from communications.

Embodiments may identify and avoid microaggressions—verbal, behavioral, or environmental slights, whether intentional or unintentional, that communicates hostile, derogatory, or negative attitudes toward stigmatized or culturally marginalized groups—and the use of language that can trigger unconscious bias and in day-to-day communications. For example, embodiments may scan user text and biased text may be identified. The biased text may be highlighted and categorized across several different classifications, such as gender, sexual orientation, ethnicity, race, country of origin, age, disability status, height, weight, etc. Embodiments may use machine learning and natural language processing to parse text and capture areas that trigger unconscious bias and/or contain microaggressions so that the language can optionally be amended automatically or by the user to be neutral.

For example, user text that may be scanned and evaluated may include text in emails, presentations, messages, documents, letters, correspondence, voice messages, etc. Embodiments may be provided as a computer program or application, a plug-in or extension to a program, etc.

Figure 1:
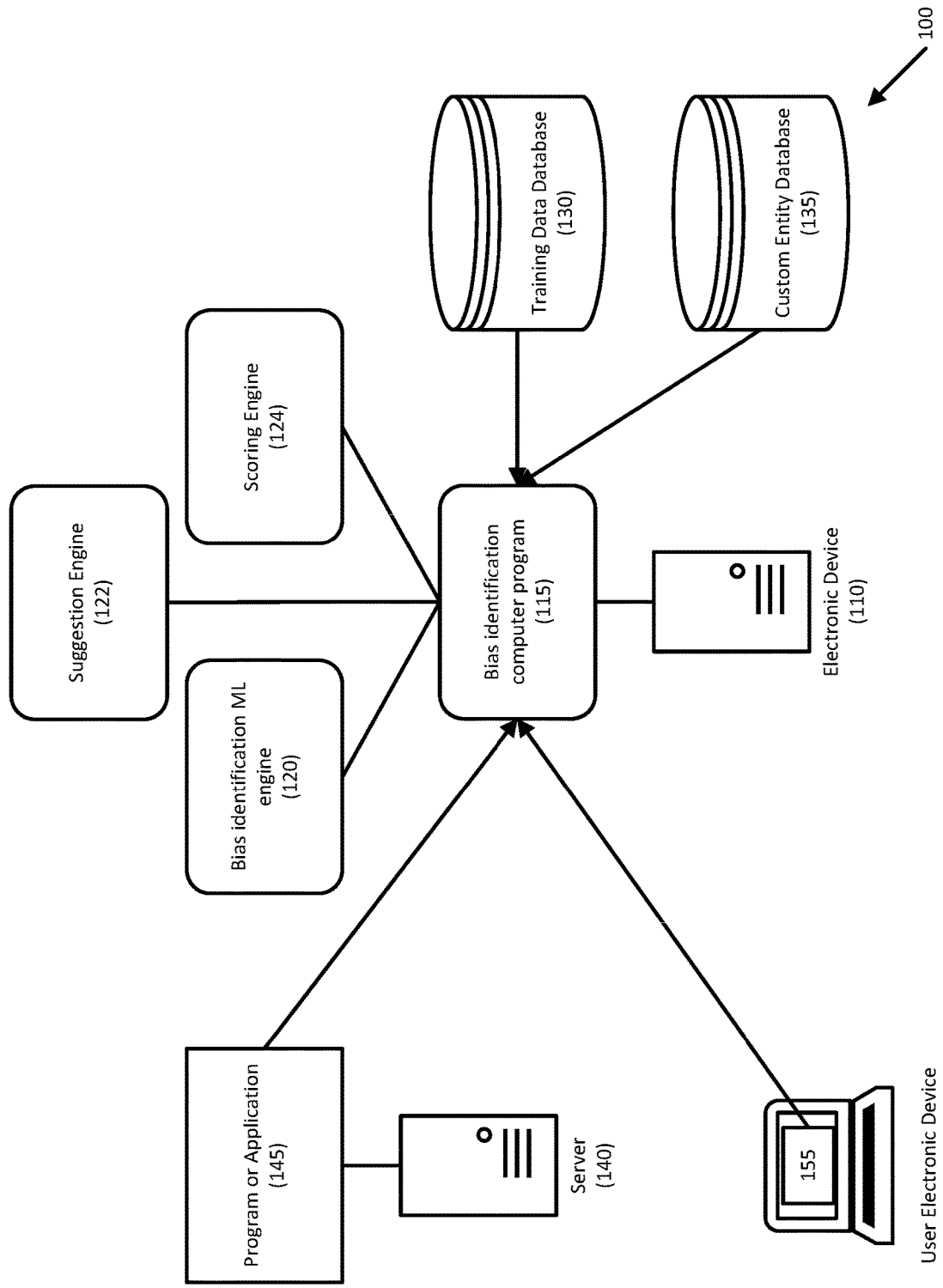
FIG. 1 depicts a system for identifying and removing bias from communications according to an embodiment.

Referring to FIG. 1, a system for identifying and removing bias from communications is disclosed according to embodiments. System 100 may include electronic device 110, which may be any suitable electronic device, including servers (e.g., cloud-based and/or physical), computers (e.g., workstations, desktops, laptops, notebooks, tablets, etc.), smart devices, Internet of Things appliances, etc.

Electronic device 110 may execute bias identification computer program 115, which may receive training data from training data database 130. In one embodiment, training data database 130 may include tables to train both bias identification machine learning (ML) engine 120 and the suggestion engine 122. For example, bias identification ML engine 120 may be trained with phrases as they apply to corporate communications (e.g., email, messages, instant messages (IMs), presentations, transcription of voice messages) along with the corresponding label of biased and not biased. This may be continuously updated with historical data. Suggestion engine 122 may be trained with assorted intentionally biased phrases with the best-case suggestions and weights for the suggestions.

Bias identification computer program 115 may train bias identification machine learning engine 120 and suggestion engine 122 with the training data using, for example, supervised training. For example, a first portion of the training data may be used to train bias identification ML engine 120, and a second portion of the training data may be used to validate the training of bias identification ML engine 120.

Bias identification computer program 115 may also receive entity data from custom entity database 135. Custom entity database 135 may include terms and phrases associated with bias, including gender, sexual orientation, ethnicity, race, country of origin, age, disability status, height, weight, etc. In one embodiment, the terms and phrases may be manually entered and bias identification ML engine 120 may be trained with these terms and phrases; in another embodiment, the terms and phrases may be learned through machine learning.

In one embodiment, users may suggest new terms and phrases for training. An administrator may review any submissions for approval before they are provided to bias identification ML engine 120.

Bias identification computer program 115 may receive text to evaluate from program or application 145 executed by server 140 (e.g., a cloud-based and/or physical server) and program or application 155 user electronic device 150, such as a computer (e.g., workstation, desktop, laptop, notebook, tablet, smart device, etc.), an Internet of Things (IoT) appliance, etc. For example, program or application 145 may be a centralized program or application, a stand-alone instance, etc. Program or application 155 may be a distributed application, a local application, a stand-alone application, etc.

In one embodiment, scoring engine 124 may score generate and output a bias score for the text. For example, scoring engine 124 may generate a bias score as a series of probabilities for each vector (e.g., a word, phrase, or sentence) that the vector is biased or not. These scores may be aggregated, averaged, and/or weighted to determine the overall bias score for the document.

In one embodiment, the score may be a letter grade (A-F), a color code (e.g., red, amber, green), a score (e.g., 1-5, 1-10, 1-100), etc. Any suitable scoring scheme may be used as is necessary and/or desired.

Suggestion engine 122 may identify and suggest replacement words for any phrases identified as having bias score of or above a certain score. For example, suggestion engine 122 may be a second machine learning engine that may be trained with a masked language model to provide alternatives in context based on the sentence structure and what needs to be replaced. The machine learning engine may output a weighted list of suggestions, similar to the training data, that may be provided.

In one embodiment, suggestion engine 122 may access a dictionary of suitable replacement words (not shown) to retrieve the suitable alternatives based on the context.

Figure 2:
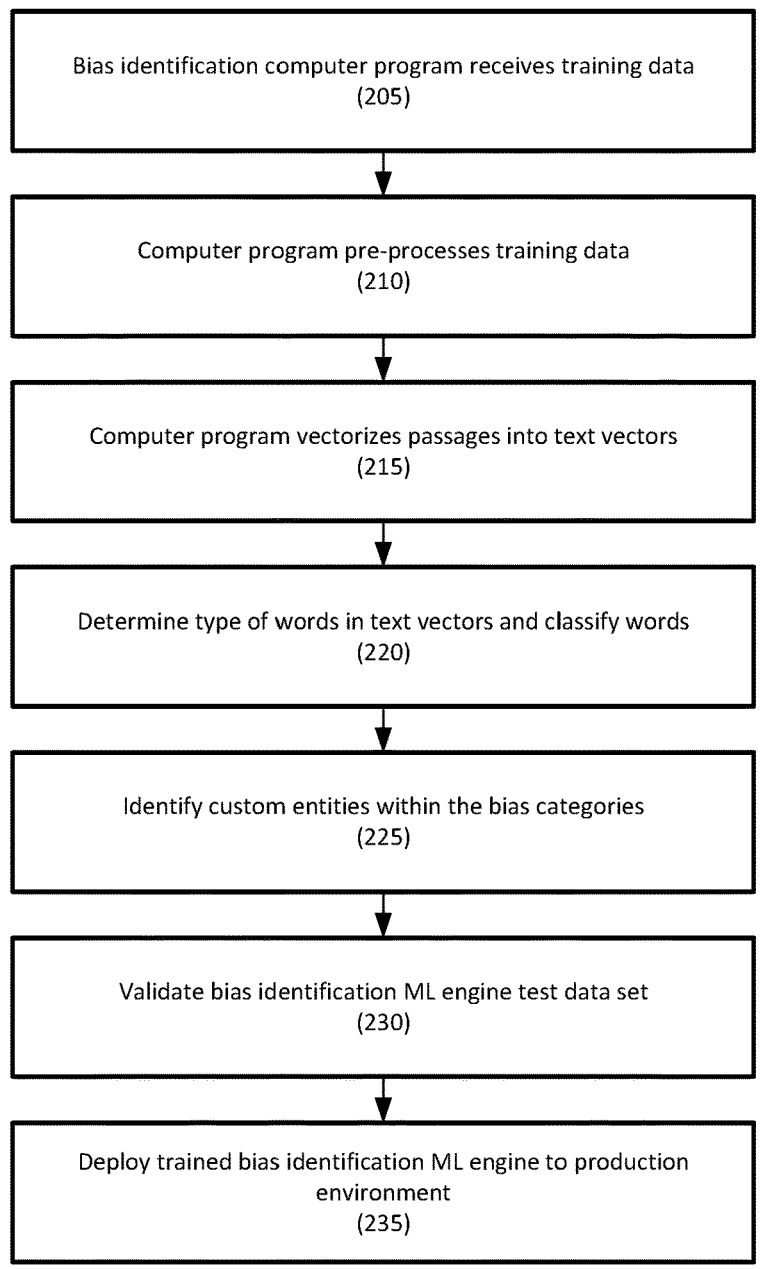
FIG. 2 depicts a method for training a bias identification machine learning engine according to embodiments.

Referring to FIG. 2, a method for training a bias identification machine learning engine for identifying and removing bias from communications disclosed according to embodiments.

In step 205, a computer program, such as a bias identification computer program, may receive training data to train a bias identification machine learning engine. The training data may include passages of words, individual words, etc. In one embodiment, the training data may include tables to train both the bias engine and the suggestion engine, both of which may be trained prior to the deployment of the program. For example, the bias identification ML engine may be trained with phrases as they apply to corporate communications (e.g., email, messages, instant messages (IMs), presentations, transcription of voice messages) along with the corresponding label of biased and not biased. This may be continuously updated with historical data. The suggestion engine may be trained with assorted intentionally biased phrases with the best-case suggestions and weights for the suggestions.

In one embodiment, a first portion of the training data may be used to train the bias identification machine learning model.

The computer program may perform supervised training of the bias identification machine learning engine using the training data. Specifically, in step 210, the computer program may preprocess the training data to filter, Lemmatize, tokenize, etc. the training data. For example, the computer program may remove filler and stop words (e.g., "is", "at", "the", etc.) from the training data.

In step 215, the computer program may convert the passages (e.g., sentences) in the training data into vectors. An example of a vectorization process is disclosed in X. Luo et al. "Attention Mechanism with BERT for Content Annotation and Categorization of Pregnancy-Related Questions on a Community Q&A Site," 2020 IEEE International Conference on Bioinformatics and Biomedicine (BIBM), 2020, pp. 1077-1081, doi: 10.1109/BIBM49941.2020.9313379, the disclosure of which is hereby incorporated, by reference, in its entirety.

In step 220, the computer program may determine the types of words present in each vector and may classify the types of words into predefined classification. For example, the words may be classified into nouns, adjectives, intensity modifiers, positive or negative sentiment, and bias categories.

An example of a classification process is provided in J. Devlin et al. "BERT: Pre-training of Deep Bidirectional Transformers for Language Understanding" (available at arxiv.org/abs/1810.04805), the disclosure of which is hereby incorporated, by reference, in its entirety.

The bias categories may be identified by the organization's human resources guidance on unconscious and conscious biases.

In step 225, based on historical results, the computer program may identify custom entities within the vectorized text. For example, a database of custom entities may be used. The custom entities may be updated as is necessary and/or desired. Custom entities may be considered to be parts of the phrase that have been determined to be relevant to the outcome of the bias determination. Custom entities may include, for example, parts of speech (e.g., noun, verb, adjective), intensity modifiers (very, somewhat, unlikely, etc.), sentiment (e.g., good, bad, etc.), any biases in the text (e.g., old, young, derogatory language/terms, etc.). Identification of the custom entities may be done using a custom entity recognition model within the bias identification computer program.

For example, in the sentence "John's work ethic was astounding," the custom entities present are John(noun), work(noun), ethic(noun), was(verb), and astounding(sentiment).

In one embodiment, each of the custom entities may be associated with bias categories, and may be so labeled.

In step 230, the computer program may validate the bias identification machine learning engine. For example, a second portion of the training data may be used to validate the incident response machine learning model.

In step 235, once the bias identification machine learning model is validated, it may be deployed to a production environment.

Figure 3A:
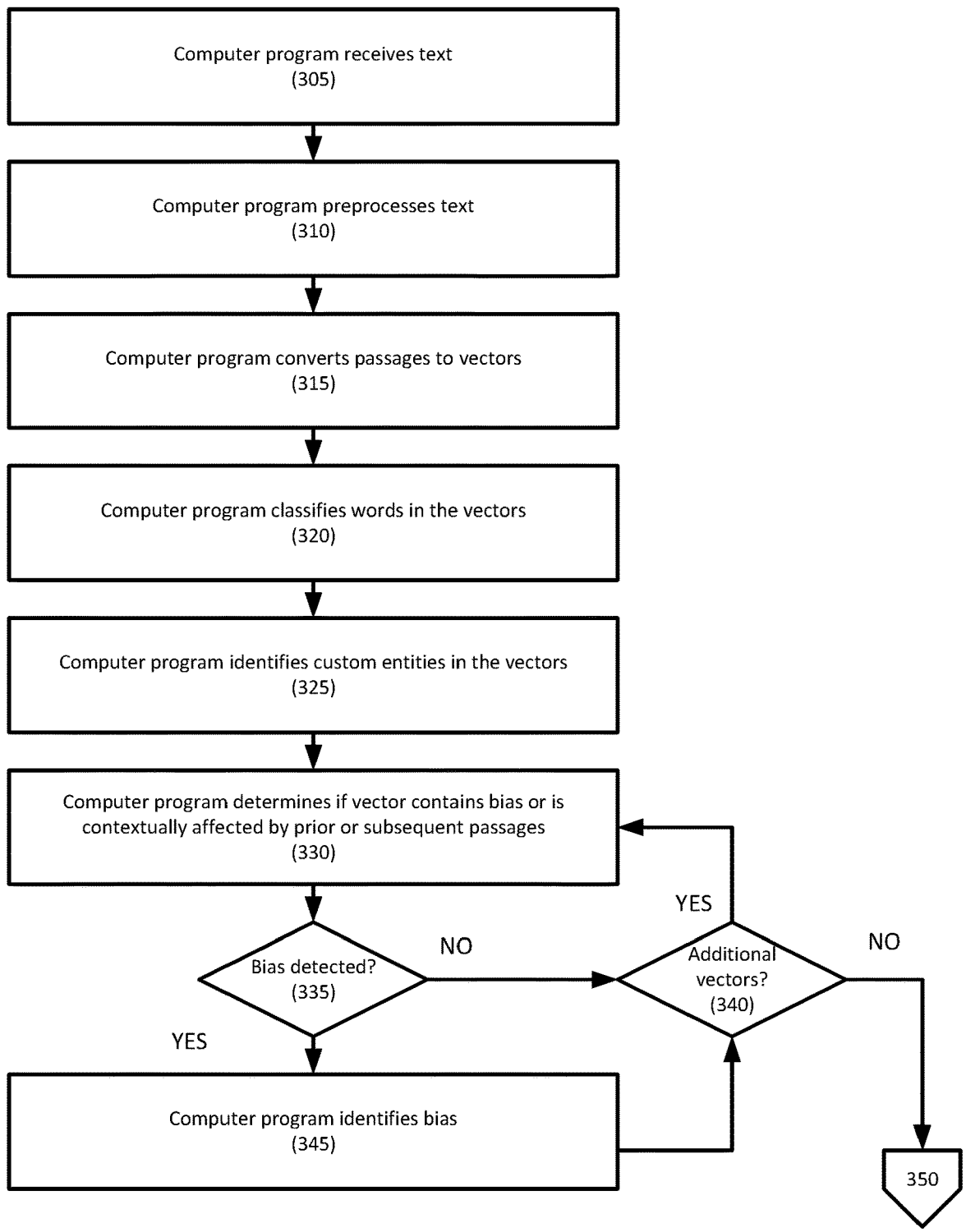
FIGS. 3A and 3B depict a method for identifying and removing bias from communications according to embodiments.
Figure 3B:
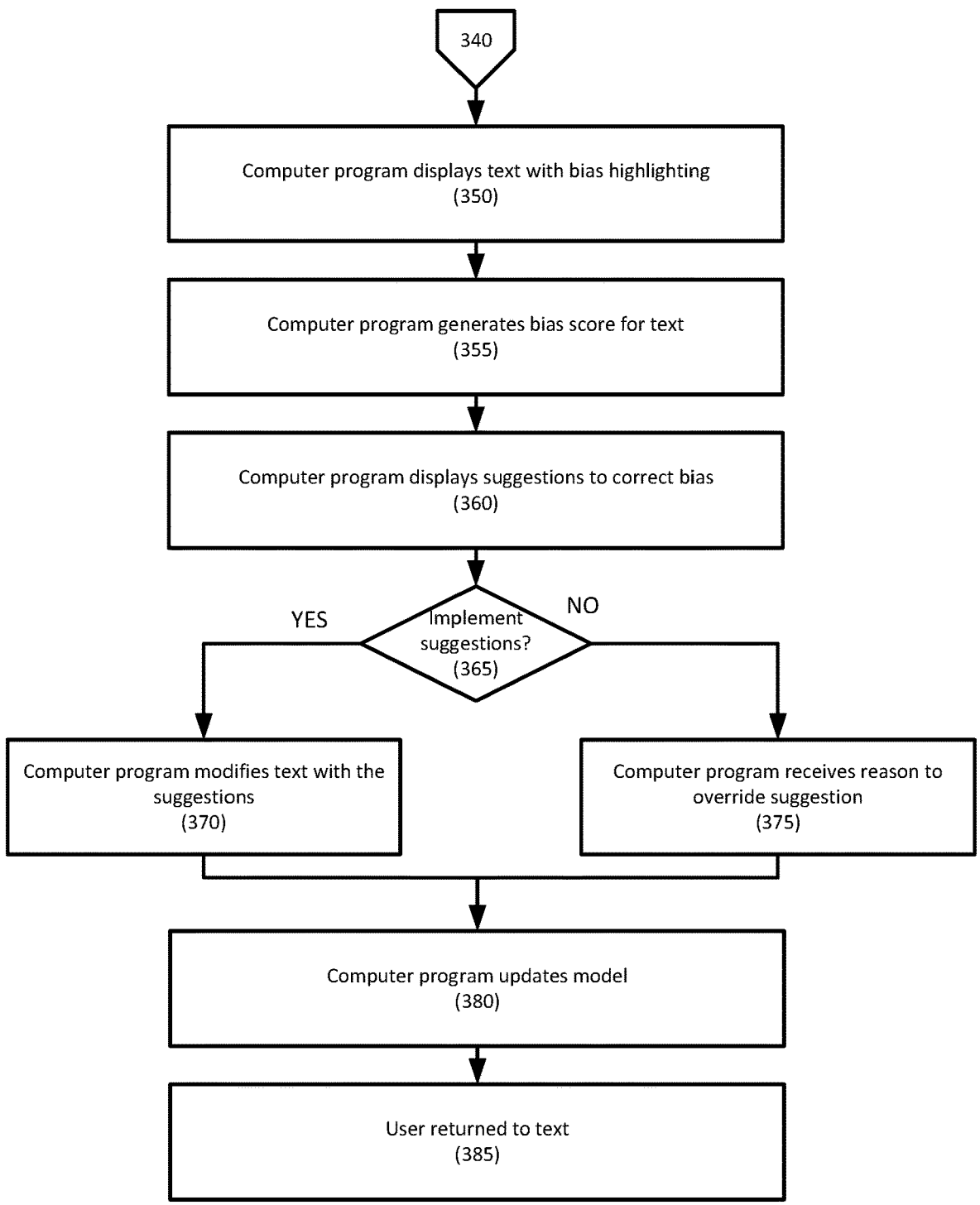

Referring to FIGS. 3A and 3B, a method for identifying and removing bias from communications is disclosed according to embodiments.

In step 305, a computer program, such as a bias identification computer program may receive text to evaluate. In one embodiment, the text may be from a document (e.g., presentation), from a message (e.g., a text message, email, etc.), from a transcribed voice recording, etc. The bias identification computer program may be part of a program or application, may be a stand-alone program or application, may be a plug-in or extension to a program or application, etc.

The text may include a plurality of passages, phrases, sentences, etc.

In step 310, the computer program may preprocess the text. This may be similar to step 210, above.

In step 315, the computer program may convert the passages (e.g., sentences) in the training data into vectors. This may be similar to step 315, above.

In step 320, the computer program may determine the types of words present in each vector and may classify the types of words into predefined classification. For example, the words may be classified into nouns, adjectives, intensity modifiers, positive or negative sentiment, and text vectors.

In step 325, the computer program may identify custom entities in the vectors. This may be similar to step 225, above.

In step 330, the computer program may iterate through the vectors to identify bias. For example, the computer program may determine if the vector being checked includes a custom entity that is in a bias category, and may also identify sentiment and sentence context. It may also determine if the vector is contextually affected by the bias in the previous or next vectors. If the vector or the preceding/following vectors do not contain a custom entity in a bias category, it can be reasonably assumed that the vector is not biased.

An example of a neutral sentence is "John's experience reflects on his many years in the industry." Because none of the custom entities (John, experience, reflects, many, years, and industry are in a bias category, this sentence is neutral.

In contrast, the sentence "John's many years in the industry make him unsuited for the organization's roadmap" is biased due to the negative reflection on John because of his years in the industry, which is an indirect reflection of his age.

An example passage for contextual determination are the vectors "Rajiv is an Indian citizen. His accent caused issues with communication." In this scenario, the accent statement may not inherently be a point of contention but coupled with the notice of being a citizen of another country causes the model to detect a locational bias.

In one embodiment, the computer program may use a distance measure algorithm (e.g., cosine similarity) to compare a phrase to one of the categories of bias within the custom identity recognizer. The output of the model may be a probability that the statement (e.g., a vector of text) is biased. The output may further include a label for the type of bias (e.g., age, gender, location, etc.). Based on a threshold, which may be customizable, a determination may be made on whether there is bias present in the vector, or if the context makes the vector have bias.

If, in step 335, bias is not detected, in step 340, a check is made to see if there are any vectors remaining. If there are, the process may continue to step 330. to evaluate the next vector.

If bias is detected, in step 345, the computer program may identify the bias by, for example, highlighting the identified vector. Specific words may be highlighted with different colors representing diverse types of bias and/or the severity of biases. The computer program may then check to see if there are additional vectors to evaluate in step 340.

Once the iteration is complete, in step 350, or on the fly, the computer program may display the evaluated text to the user with the highlighting.

In step 355, the computer program may generate a bias score for the text. The bias score may be generated at any point in the process. For example, the bias score may be generated using an objective approach based on a percentage of the words in the text that related to biased phrasing, or a subjective approach using a trained machine learning engine based on the probability of a passage of text being biased or not. The probability of something being biased may be the output, with a direct correlation (e.g., high probability, high score (bad outcome), low probability, low score (good outcome)). The threshold for the probability may be experimentally determined, may be based on user feedback, etc.

In step 360, the computer program may present suggestions to the user to make the wording neutral. The computer program may also explain the different types of bias. In one embodiment, the suggestions and/or explanations may be provided in response to the user "hovering" over highlighted text.

In step 365, the computer program may provide an option to correct the bias. If the user selects this option, in step 370, the computer program may implement the suggestion in the document.

In another embodiment, the user may manually update the text. The change to the text may be monitored.

If the user does not select the option to correct the bias, in step 375, the computer program may receive a reason from the user to override the suggestion. In one embodiment, the reason may be provided in freeform text; in another embodiment, the reason may be received from a menu of options, such as "not an issue in view of context," "not bias," "pronouns addressed in signatures," "words have been pre-established for use in this context," etc.

In one embodiment, the reason may be reviewed by, for example, the organization's HR department for false negatives/false positives before being used to update the bias identification ML model.

In step 380, the computer program may update the bias identification ML model with the feedback—the acceptance of the suggestion or the reason for overriding the suggestion.

In step 385, the computer program may return the text to the user. The text may include the highlighting, or it may be clean text.

Figure 4:
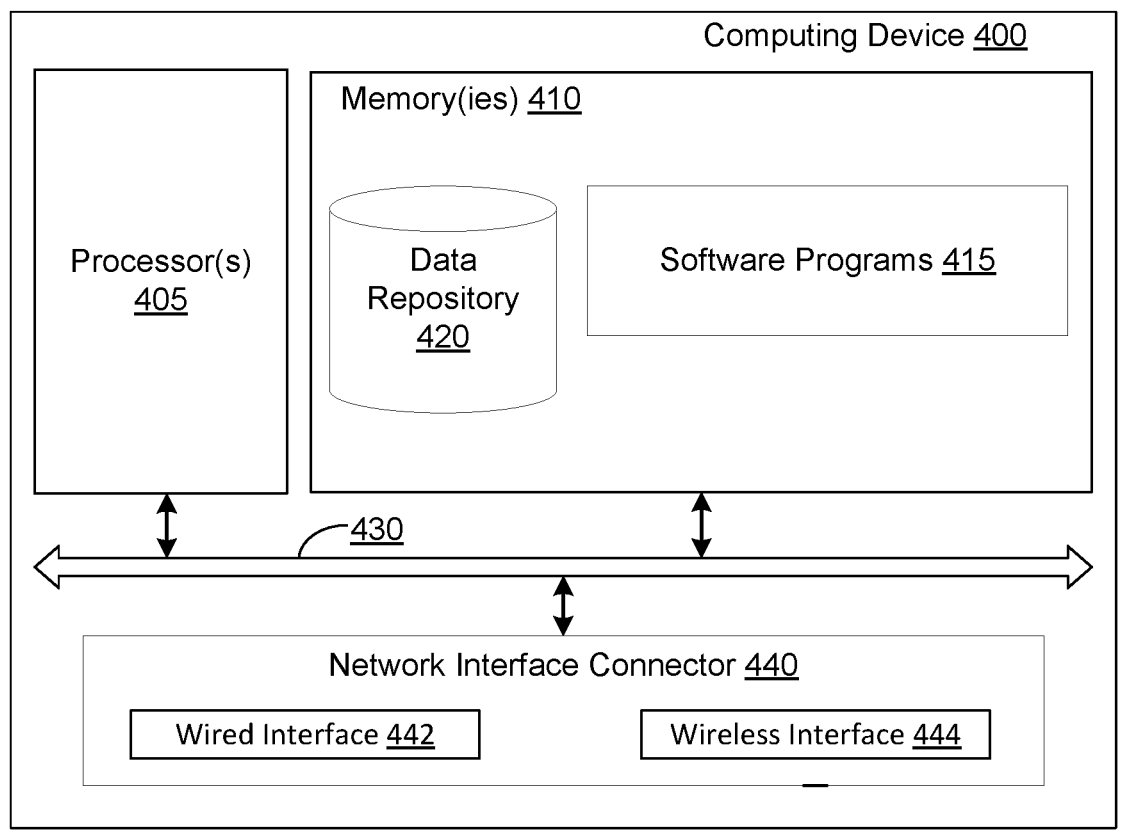
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

The disclosures of U.S. Provisional Patent Application Ser. Nos. 63/126,935 and 63/138,951, U.S. patent application Ser. No. 17/538,763, and U.S. patent application Ser. No. 17/664,579 are hereby incorporated, by reference, in their entireties.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for identifying bias, comprising:
   receiving, by a bias identification computer program executed by an electronic device and from a user electronic device, text comprising a plurality of passages;
   converting, by the bias identification computer program, each of the plurality of passages into a vector;
   retrieving, by the bias identification computer program, a plurality of custom entities from a custom entity database, wherein the custom entity database comprises a plurality of categories including a plurality of bias categories, wherein each of the bias categories comprises terms and phrases associated with bias;
   identifying, by the bias identification computer program, a plurality of custom entities in the vectors;
   determining, by the bias identification computer program, that one of the custom entities from one of the plurality of vectors or in a preceding or subsequent vector is in one of the bias categories using a trained bias identification machine learning engine;
   returning, by the bias identification computer program and to the user electronic device, an indication that the one of the plurality of vectors is biased;
   identifying, by the bias identification computer program, a replacement word for the custom entity that is in the bias category;
   replacing, by the bias identification computer program, the vector in the bias category with the replacement word; and
   outputting, by the bias identification computer program, the text with the replacement word.

2. The method of claim 1, wherein the text is from a document, an email, or a transcription of audio.

3. The method of claim 1, wherein the custom entities comprise parts of speech, intensity modifiers, and/or sentiment.

4. The method of claim 1, further comprising:
   suggesting, by the bias identification computer program, the replacement word in the indication that the one of the plurality of vectors is biased.

5. The method of claim 1, wherein the replacement word is identified using a trained machine learning scoring engine.

6. The method of claim 1, further comprising:
   generating, by the bias identification computer program, a bias score for the text.

7. The method of claim 1, further comprising:
   receiving, by the bias identification computer program, feedback on the indication from the user electronic device; and
   retraining, by the bias identification computer program, the trained bias identification machine learning engine based on the feedback.

8. A system, comprising:
   a user electronic device providing text comprising a plurality of passages, wherein the text is from a document, an email, or a transcription of audio;
   a bias identification computer program executed by an electronic device; and
   a custom entity database comprising a plurality of custom entities, wherein the custom entity database comprises a plurality of categories including a plurality of bias categories, wherein each of the bias categories comprises terms and phrases associated with bias;
   wherein:
      the bias identification computer program receives text comprising a plurality of passages from the user electronic device;
      the bias identification computer program converts each of the plurality of passages into a vector;
      the bias identification computer program retrieves a plurality of custom entities from the custom entity database;
      the bias identification computer program identifies a plurality of custom entities in the vectors;
      the bias identification computer program uses a trained bias identification machine learning engine to determine if one of the custom entities in one of the plurality of vectors or in a preceding or subsequent vector is in one of the bias categories;
      the bias identification computer program returns an indication that the one of the plurality of vectors is biased to the user electronic device;
      the bias identification computer program identifies a replacement word for the custom entity that is in the bias category;
      the bias identification computer program replaces the vector in the bias category with the replacement word replacement word in the text; and
      the bias identification computer program outputs, the text with the replacement word.

9. The system of claim 8, wherein the custom entities comprise parts of speech, intensity modifiers, and/or sentiment.

10. The system of claim 8, wherein the replacement word is identified using a trained machine learning scoring engine.

11. The system of claim 8, wherein the bias identification computer program generates a bias score for the text.

12. The system of claim 8, wherein the bias identification computer program receives feedback on the indication from the user electronic device and retrains the trained bias identification machine learning engine based on the feedback.

13. A non-transitory computer readable storage medium, including instructions stored thereon, which when read and executed by one or more computer processors, cause the one or more computer processors to perform steps comprising:

receiving, from a user electronic device, text comprising a plurality of passages, wherein the text is from a document, an email, or a transcription of audio;

converting each of the plurality of passages into a vector;

retrieving a plurality of custom entities from a custom entity database, wherein the custom entity database comprises a plurality of categories including a plurality of bias categories, wherein each of the bias categories comprises terms and phrases associated with bias;

identifying a plurality of custom entities in the vectors;

determining that one of the custom entities from one of the plurality of vectors or in a preceding or subsequent vector is in one of the bias categories using a trained bias identification machine learning engine;

returning, to the user electronic device, an indication that the one of the plurality of vectors is biased;

identifying a replacement word for the custom entity that is in the bias category;

replacing the vector in the bias category with the replacement word; and outputting the text with the replacement word.

14. The non-transitory computer readable storage medium of claim 13, further including instructions stored thereon, which when read and executed by one or more computer processors, cause the one or more computer processors to perform steps comprising:

identifying custom entities in the text, wherein the custom entities comprise parts of speech, intensity modifiers, and/or sentiment; and classifying the custom entities into a plurality of categories, wherein one of the categories comprises the bias category.

15. The non-transitory computer readable storage medium of claim 13, wherein the replacement word is identified using a trained machine learning scoring engine.

16. The non-transitory computer readable storage medium of claim 13, further including instructions stored thereon, which when read and executed by one or more computer processors, cause the one or more computer processors to generate a bias score for the text.

17. The non-transitory computer readable storage medium of claim 13, further including instructions stored thereon, which when read and executed by one or more computer processors, cause the one or more computer processors to receive feedback on the indication from the user electronic device and to retrain the trained bias identification machine learning engine based on the feedback.

* * * * *